US009705839B2

United States Patent
O'Sullivan et al.

(10) Patent No.: US 9,705,839 B2
(45) Date of Patent: *Jul. 11, 2017

(54) CLIENT SIDE SOCIAL NETWORK RESPONSE TRACKING

(71) Applicant: International Business Machines Corporation, Armonk, NY (US)

(72) Inventors: Patrick J. O'Sullivan, Dublin (IE); Hema Srikanth, Cary, NC (US); Carol S. Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/175,034

(22) Filed: Jun. 7, 2016

(65) Prior Publication Data

US 2016/0294764 A1   Oct. 6, 2016

Related U.S. Application Data

(63) Continuation of application No. 11/972,305, filed on Jan. 10, 2008, now Pat. No. 9,390,397.

(51) Int. Cl.
*G06F 3/00* (2006.01)
*G06F 9/44* (2006.01)
(Continued)

(52) U.S. Cl.
CPC ............. *H04L 51/32* (2013.01); *G06Q 10/10* (2013.01); *H04L 51/12* (2013.01); *H04L 51/24* (2013.01); *H04L 67/306* (2013.01)

(58) Field of Classification Search
None
See application file for complete search history.

(56) References Cited

U.S. PATENT DOCUMENTS 6,571,234 B1   5/2003   Knight et al.
7,831,684 B1   11/2010   Lawler et al.
(Continued)

FOREIGN PATENT DOCUMENTS

JP    2004320227   11/2004
JP    2006155315   6/2006
WO    WO2007/044590   4/2007

OTHER PUBLICATIONS

Yukawa, et al., "An Important Posting Notification Function in an Intelligent Bulletin Board System for e-Learning," KES, 2007, pp. 761-768.

(Continued)

*Primary Examiner* — Craig Dorais
(74) *Attorney, Agent, or Firm* — Steven M. Greenberg, Esq.; CRGO Law

(57) ABSTRACT

Embodiments of the present invention address deficiencies of the art in respect to response subscriptions and provide a method, system and computer program product for response tracking across social networks. In one embodiment of the invention, a social networking response tracking method can be provided. The method can be performed by client-side logic and can include associating subscribers with a user or a group of users based upon a posting by the user or a user in the group of users within a client computing device for the user, aggregating different postings from the user to correspondingly different forums disposed about a global computer communications network, and, notifying the subscribers of the aggregated postings.

18 Claims, 2 Drawing Sheets

(51) Int. Cl.
  *G06F 9/46* (2006.01)
  *G06F 13/00* (2006.01)
  *H04L 12/58* (2006.01)
  *G06Q 10/10* (2012.01)
  *H04L 29/08* (2006.01)

(56) References Cited

U.S. PATENT DOCUMENTS

| | | |
|---|---|---|
| 7,860,898 B1 | 12/2010 | Moranta et al. |
| 2002/0174205 A1 | 11/2002 | Nakashima |
| 2004/0128357 A1 | 7/2004 | Giles et al. |
| 2005/0198299 A1 | 9/2005 | Beck et al. |
| 2006/0184612 A1 | 8/2006 | Izdepski et al. |
| 2006/0194185 A1 | 8/2006 | Goldberg et al. |
| 2006/0271859 A1 | 11/2006 | Gorzela |
| 2007/0143502 A1 | 6/2007 | Garcia-Martin et al. |
| 2007/0162566 A1 | 7/2007 | Desai et al. |
| 2008/0040427 A1 | 2/2008 | Shroff et al. |
| 2008/0133510 A1 | 6/2008 | Timmons |
| 2008/0189217 A1 | 8/2008 | Jhunjhunwala |
| 2008/0215607 A1 | 9/2008 | Kaushansky et al. |
| 2008/0222531 A1 | 9/2008 | Davidson et al. |
| 2008/0244438 A1 | 10/2008 | Peters et al. |
| 2009/0063379 A1 | 3/2009 | Kelly |
| 2009/0172111 A1 | 7/2009 | Jones et al. |
| 2010/0125551 A1 | 5/2010 | Bacila et al. |

OTHER PUBLICATIONS

Abe et al., "Avisualization System for Making Choice of Electronic . . . " IEICE Transactions on Communications, The Inst. of Electr. Info and Comm. Eng., 2002, vol. J85-D-I.p. 653.

Noguchi et al., "Development of the highly efficient bulletin board access system . . . " Technical Report of IEICE, The Insti. of Electr. Info and Comm. Eng., 2002, vol. 102 No. 45.

Message Filtering Administration Guide • Google Message Filtering, Apr. 10, 2002, Google, pp. 237 and 281.

CLIENT SIDE SOCIAL NETWORK RESPONSE TRACKING

CROSS-REFERENCE TO RELATED APPLICATIONS

This application is a Continuation of U.S. patent application Ser. No. 11/972,305, filed on Jan. 10, 2008, the entirety of which is incorporated herein by reference.

REFERENCE TO CO-PENDING APPLICATIONS FOR PATENT

The present application is related to the following co-assigned U.S. Patent Applications, which are expressly incorporated by reference herein:

U.S. application Ser. No. 11/972,284, entitled "CENTRALIZED SOCIAL NETWORK RESPONSE TRACKING", filed on Jan. 10, 2008.

BACKGROUND OF THE INVENTION

Field of the Invention

The present invention relates to the field of social networking and more particularly to tracking authored content amongst multiple different social networks.

Description of the Related Art

Collaborative computing refers to the shared responsibility for content elements in a computing system. Originating from notions in project management more than two decades ago, collaborative computing environments now span mere project management and calendaring and scheduling systems to full-fledged activity-centric environments. Recent developments in Internet technologies—namely second generation Web based communities, often referred to as social networks—have injected new life into collaborative computing systems. Exemplary technologies that have broadened the collaborative capabilities of such social networking systems include integration with Wikis, blogs, discussion forums, team rooms, shared bookmarks, syndicate feeds and the like.

Wikis, blogs, forums and team rooms share similar qualities in that all involve a basic post and response paradigm. A post and response paradigm refers to the posting of content by one collaborator and the responsive posting of content by a responsive collaborator and so forth. The progenitor to the post and response paradigm can be found in the basic threaded message board discussions three decades old. Whereas a discussion forum is akin to a message board discussion, a team room is an advanced combination of different collaborative elements including discussion forums to provide collaborative tools for a team of collaborators in order to advance a team goal. A blog is a form of discussion forum where a single individual provides the driving content and other collaborators optionally can post commentary addressing the postings of the single individual. Thus, the blog can be viewed as a publicly viewable diary.

Wikis provide a variation on the discussion forum in that the permitted topics of a wiki are terms to be defined and the definitions are provided by the collaborators in order to converge upon a socially acceptable term definition amongst the collaborators. Finally, shared bookmarks are bookmarks to content shared amongst collaborators and associated with commonly specified tags. The more individuals applying the same tags to associated content, the more popular the content will be viewed and will be visually represented as such in the form of "tag clouds".

Within a social network, individual users identify other users sharing similar ideas, career paths, job responsibilities or team responsibilities. Whether or not different users actually know each other, as part of the relationship between user postings by a given user can be automatically routed to other interested users, as can responses. Referred to as a subscription or a syndicated feed, interested users can link to many different forums, Wikis, blogs and the like in order to be assured a notification when a user publishes content. Of import, a subscription to the postings of a user always relates to the forum in which the posting is provided, whether that forum be a Wiki, blog, discussion forum, team room or other such similar space.

Still, for many, the interest in the postings of a user in one forum is not limited to the forum alone and it can be desirable to subscribe to the postings of the same user in different forums. To achieve a set of subscriptions for postings of a single user in multiple different forums, correspondingly different subscriptions to correspondingly different forums must be performed. To the extent that one is not aware of the various forums publishing the postings of the single user, one is compelled to search the Internet for content.

BRIEF SUMMARY OF THE INVENTION

Embodiments of the present invention address deficiencies of the art in respect to response subscriptions and provide a novel and non-obvious method, system and computer program product for response tracking across social networks. In one embodiment of the invention, a social networking response tracking method can be provided. The method can include associating subscribers with a user or a group of users based upon a posting by the user or a user in the group of users within a client computing device for the user, aggregating different postings from the user to correspondingly different forums disposed about a global computer communications network, and, notifying the subscribers of the aggregated postings.

In an aspect of the embodiment, aggregating different postings from the user to correspondingly different forums disposed about a global computer communications network can include receiving notifications from the content browser associated with the user of the different postings to the correspondingly different forums, and, for each notification, retrieving an associated posting from a corresponding one of the forums and storing the retrieved posting in a data store in response to the notification. In another aspect of the embodiment, aggregating different postings from the user to correspondingly different forums disposed about a global computer communications network can include receiving notifications from the different forms of the different postings by the user, and, for each notification, retrieving an associated posting from a corresponding one of the forums and storing the retrieved posting in a data store in response to the notification.

In yet another aspect of the embodiment, associating subscribers with a user based upon a posting by the user can include selecting the posting by the user shown in a content browser, and activating a user interface control in the content browser configured to request an association with the user. Notably, notifying the subscribers of the aggregated postings can include filtering notifications for the subscribers according to forum type for the correspondingly different forums. Further, the method can include rendering a posting in one of the forums by the user in a content browser of a subscriber, locating other postings by the user in others of the different forums amongst the aggregated different postings, and listing the located postings in the content browser. Finally, the method can include providing a search engine interface to the aggregated different postings.

In another embodiment of the invention, a social networking data processing system can be provided. The system can include response tracking logic executing in a client computing device of a user, and a data store of responses coupled to the client computing device. The response tracking logic can include program code enabled to associate subscribers with the user based upon a posting by the user to one of a number of different forums coupled to the client computing device over a computer communications network, to aggregate different postings from the user to the different forums in the data store, and to notify the subscribers of the aggregated postings as the postings occur. For example, the different forums can include wikis, blogs, threaded discussion forums, team rooms and shared document libraries.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for response tracking across social networks. In accordance with an embodiment of the present invention, the postings of a user can be tracked across different forums. Subscribers to the postings of the user, in turn, can be notified of the postings on the different forums as the postings occur irrespective of the forum in which the postings occur and irrespective of whether or not the subscribers are aware of the forums. The tracking and notification can occur in logic coupled to each subscriber in concert with a remote response tracking database, in logic coupled to participating forums in concert with the remote response tracking database. In this way the subscribers can track the postings of a user of interest without searching out the different forums to which the user of interest posts.

Figure 1:
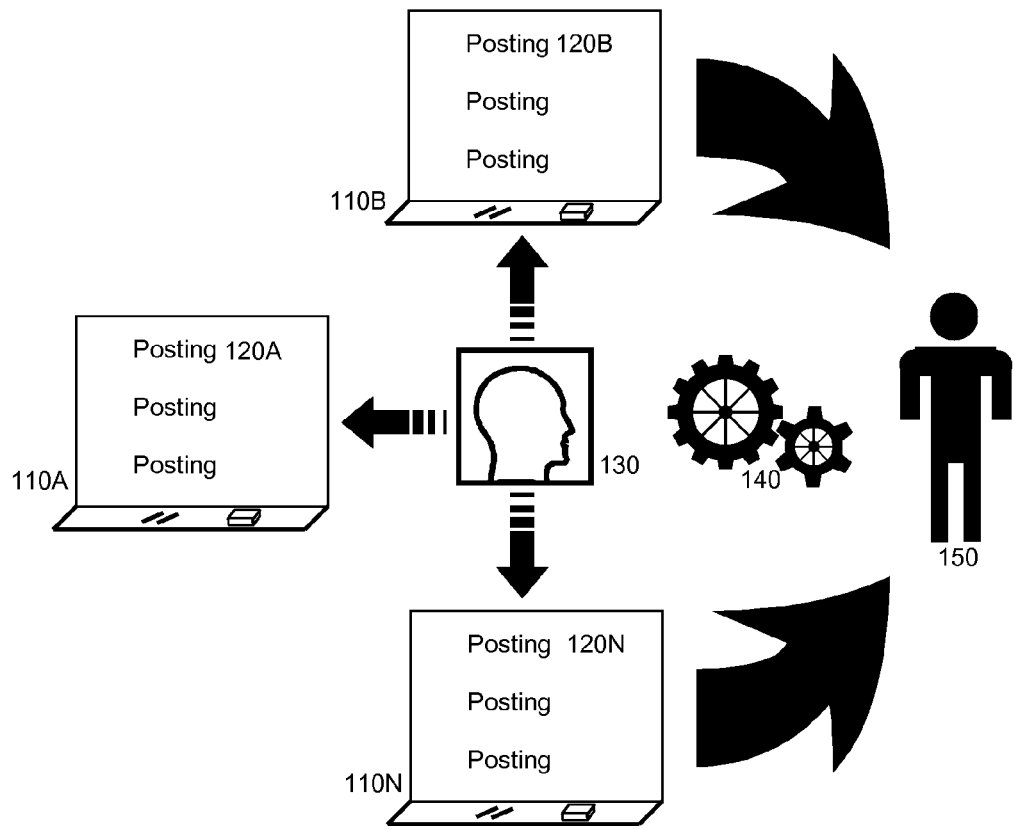
FIG. 1 is a pictorial illustration of a process for response tracking across social networks.

In further illustration, FIG. 1 is a pictorial illustration of a process for response tracking across social networks. As shown in FIG. 1, a subscriber 150 can subscribe to the forum postings 120A, 120B, 120N of a user 130 and an automated response tracking process 140 can monitor the postings 120A, 120B, 120N of the user 130 to different forums 110A, 110B, 110N irrespective of whether or not the subscriber 150 knows of the different forums 110A, 110B, 110N. Rather, the postings 120A, 120B, 120N can be reported to the automated response tracking process 140 which in turn can aggregate the postings 120A, 120B, 120N for delivery to the subscriber 130. In this way, the subscriber 150 need not locate and subscribe to each of the different forums 110A, 110B, 110N in order to read the postings of the user 130.

Figure 2:
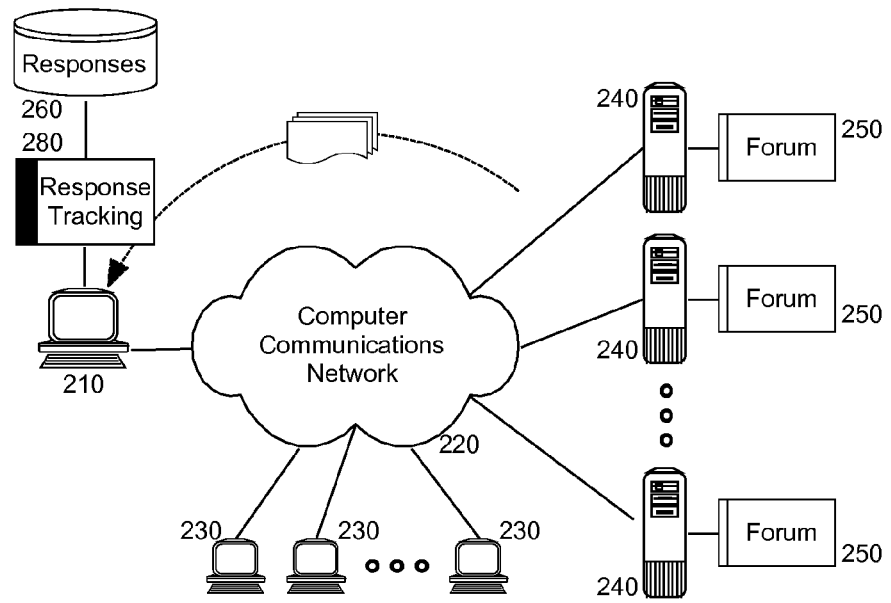
FIG. 2 is a schematic illustration of a social networking system configured for response tracking across social networks; and, FIG. 3 is a flow chart illustrating a process for response tracking across social networks.

Notably, the automated response tracking process 140 can be managed in a social networking system either as part of the clients of the system, the different forums in the system or some combination of both. In illustration, FIG. 2 schematically depicts a social networking system configured for client side response tracking across social networks. The system can include a plurality of computing systems 240 each supporting a different discussion forum 250 and each being configured to receive postings and to provide viewing of the postings by end users over computer communications network 220. To that end, the discussion forum 250 can range from a blog to a wiki to a threaded discussion forum to a team room, to a shared document library to name only a few variations.

Different users 210 (only a single user shown for purposes of illustrative simplicity) can provide postings and responses to postings (collectively, "postings") to different forums 250 from over the computer communications network 220. Notably, each of the users 210 can be an individual, or alternatively a grouping of individuals. Response tracking logic 280 coupled to user 210 can track the postings of the user 210 in a data store of responses 260. In this regard, the response tracking logic 280 can include program code enabled to receive notification of the postings of the user and to aggregate the postings in the data store of responses 260. The program code of the response tracking logic 280 further can be enabled to notify different subscribers 230 to the postings of the user 210 of the postings from over the computer communications network.

In this regard, each of the subscribers 230 need only specify the user 210 and not any particular one of the forums 250 in order to receive notification of the postings by the user 210 to the forums 250 from the response tracking logic 280. Optionally, the subscribers 230 can limit the notifications of the postings based upon the nature of the forums 250 to which postings have occurred. For example, different ones of the subscribers 230 can limit notifications to postings to wikis and threaded discussion forums, but not blogs. Yet further, a user interface add-on can be provided to the content browser of each of the subscribers 230 permitting the subscribers to activate the add-on when selecting a posting of the user 210 in order to subscribe to an aggregation of postings by the user 210 across all or selected ones of the forums 250.

Further, the program code of the response tracking logic 280 can trap the postings as they occur in the client of the user 210, or the response tracking logic 280 can query or passively receive notification of the postings by the different forums 250 registered with the response tracking logic 280, or the program code of the response tracking logic can scan each of the forums 250 seeking out new postings by the user 210. Yet further, the receipt of notification of the postings by the different forums 250 can be limited for the user 210 according to a security policy defining which content the user 210 can track. Finally, the postings can be stored locally, and thereafter submitted to a central repository.

Once the data store of responses 260 has been populated with postings of the user 210, the data store of responses 260 can be searched, for instance for a task bar anchored control, using a content searching engine to provide further filtering and aggregating possibilities for the subscribers 230. Further, the client task bar anchor control can be enhanced so that while tracking on an individual is being reviewed, an Internet search engine search can be conducted to collect a composite list of results. Yet further, when the user 210 posts to a blog or collaborative forum, upon saving the entry in the data store of responses 260, a unique signature block entry is appended and posted. This represents a unique tag that can be searched on for retrieval via a search engine.

Figure 3:
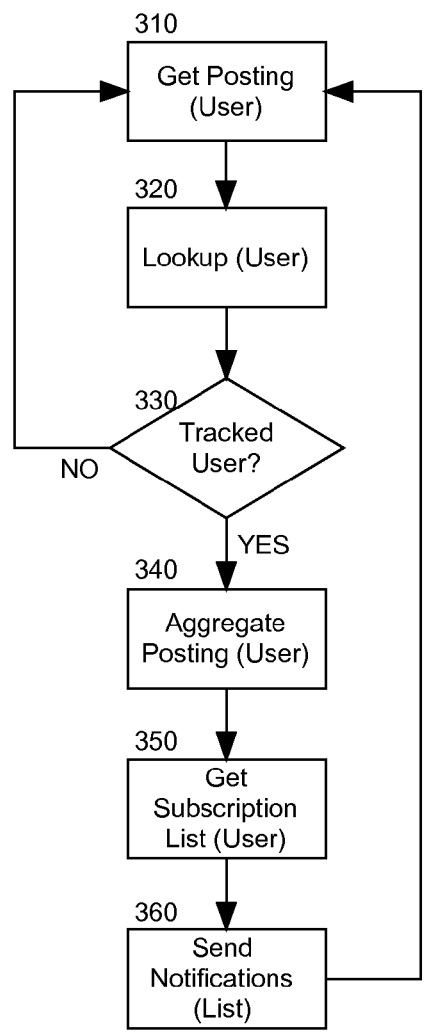

In yet further illustration of the operation of the response tracking logic 280, FIG. 3 is a flow chart illustrating a process for response tracking across social networks. Beginning in block 310, a posting by a user in a forum can be detected and in block 320 the user can be compared to a list of tracked users. In decision block 330, it can be determined whether or not the user is a tracked user. If so, in block 340 the posting can be aggregated with other postings from other forums. Thereafter, in block 350 a list of subscribers to the postings of the user can be retrieved. Finally, in block 360 notification of the posting can be provided to each subscriber in the list excepting for those subscribers whom have expressed a preference not to receive postings from a forum type shared by the forum in which the posting had been detected.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A social networking response tracking method comprising:
    associating a plurality of subscribers with a user based upon a posting by the user within a client computing device for the user;
    aggregating different postings from the user to correspondingly different forums coupled to the client computing device over disposed about a global computer communications network;
    storing the different postings in a data store of responses;
    notifying a subset of the plurality of subscribers of the aggregated different postings in response to determining the plurality of subscribers expressing a preference for not receiving postings of a determined type of forum; and
    searching the data store of responses for a task bar anchored control.

2. The method of claim 1, wherein the plurality of subscribers are associated with a user based to which the user belongs.

3. The method of claim 1, wherein associating the plurality of subscribers with a user based upon a posting by the user within the client computing device for the user, comprises:
    selecting the posting by the user shown in a content browser; and,
    activating a user interface control in the content browser configured to forward a request to the client computing device for the user for an association with the user.

4. The method of claim 1, wherein aggregating different postings from the user to correspondingly different forums coupled to the client computing device over the global computer communications network, comprises:
    receiving notifications from the content browser associated with the user of the different postings to the correspondingly different forums; and,
    for each notification, retrieving an associated posting from a corresponding one of the forums and storing the retrieved posting in a data store in response to the notification.

5. The method of claim 1, wherein aggregating different postings from the user to correspondingly different forums coupled to the client computing device over the global computer communications network, comprises:
    receiving notifications from the different forms of the different postings by the user; and,
    for each notification, retrieving an associated posting from a corresponding one of the forums and storing the retrieved posting in a data store in response to the notification.

6. The method of claim 1, wherein notifying the subset of the plurality of subscribers of the aggregated postings, comprises filtering notifications for the subset of the plurality of subscribers according to the determined type of forum for the correspondingly different forums.

7. The method of claim 1, further comprising:
    rendering a posting in one of the forums by the user in a content browser of a subscriber;

locating other postings by the user in others of the different forums amongst the aggregated different postings; and, listing the located postings in the content browser.

8. The method of claim 1, further comprising providing a search engine interface to the aggregated different postings.

9. A social networking data processing system comprising:

response tracking logic executing in a client computing device for a user; and, a data store of responses coupled to the client computing device;

the response tracking logic comprising program code enabled to associate a plurality of subscribers with the user based upon a posting by the user to one of a plurality of different forums coupled to the client computing device over a computer communications network, to aggregate different postings from the user to the different forums in the data store, and to notify the subscribers of the aggregated postings as the postings occur in response to determining the plurality of subscribers expressing a preference for not receiving postings of a determined type of forum.

10. The system of claim 9, wherein the different forums comprises forums selected from the group consisting of wilds, blogs, threaded discussion forums, team rooms and shared document libraries.

11. A computer program product comprising a non-transitory computer usable medium embodying computer usable program code for social networking response tracking, the computer program product comprising:

computer usable program code for associating a plurality of subscribers with a user based upon a posting by the user within a client computing device for the user;

computer usable program code for aggregating different postings from the user to correspondingly different forums disposed about coupled to the client computing device over a global computer communications network;

computer usable program code for storing the different postings in a data store of responses;

computer usable program code for notifying a subset of the plurality of subscribers of the aggregated different postings in response to determining the plurality of subscribers expressing a preference for not receiving postings of a determined type of forum computer usable program code for searching the data store of responses for a task bar anchored control.

12. The computer program product of claim 11, wherein the computer usable program code for associating the plurality of subscribers with the user based upon a posting by the user within the client computing device for the user, comprises computer usable program code for associating the plurality of subscribers with a user group based upon a posting by a user in the user group.

13. The computer program product of claim 11, wherein the computer usable program code for associating the plurality of subscribers with the user based upon a posting by the user within the client computing device for the user, comprises:

computer usable program code for selecting the posting by the user shown in a content browser; and, computer usable program code for activating a user interface control in the content browser configured to forward a request to the client computing device for the user for an association with the user.

14. The computer program product of claim 11, wherein the computer usable program code for aggregating different postings from the user to correspondingly different forums coupled to the client computing device over the global computer communications network, comprises:

computer usable program code for receiving notifications from the content browser associated with the user of the different postings to the correspondingly different forums; and, computer usable program code for retrieving an associated posting from a corresponding one of the forums and storing the retrieved posting in a data store in response to the notification for each notification.

15. The computer program product of claim 11, wherein the computer usable program code for aggregating different postings from the user to correspondingly different forums coupled to the client computing device over the global computer communications network, comprises:

computer usable program code for receiving notifications from the different forms of the different postings by the user; and, computer usable program code for retrieving an associated posting from a corresponding one of the forums and storing the retrieved posting in a data store in response to the notification for each notification.

16. The computer program product of claim 11, wherein the computer usable program code for notifying the subset of the plurality of subscribers of the aggregated postings, further comprises computer usable program code for filtering notifications for the subset of the plurality of subscribers according to the determined type of forum for the correspondingly different forums.

17. The computer program product of claim 11, further comprising:

computer usable program code for rendering a posting in one of the forums by the user in a content browser of a subscriber;

computer usable program code for locating other postings by the user in others of the different forums amongst the aggregated different postings; and, computer usable program code for listing the located postings in the content browser.

18. The computer program product of claim 11, further comprising computer usable program code for providing a search engine interface to the aggregated different postings.

* * * * *